United States Patent [19]

Kozulla

[11] Patent Number: 5,882,562
[45] Date of Patent: Mar. 16, 1999

[54] PROCESS FOR PRODUCING FIBERS FOR HIGH STRENGTH NON-WOVEN MATERIALS

[75] Inventor: Randall Earl Kozulla, Social Circle, Ga.

[73] Assignee: Fiberco, Inc., Wilmington, Del.

[21] Appl. No.: 998,592

[22] Filed: Dec. 29, 1997

Related U.S. Application Data

[63] Continuation of Ser. No. 358,884, Dec. 19, 1994, abandoned.

[51] Int. Cl.⁶ .............................. D01F 1/10; D01F 6/06; D01F 8/06; D01F 11/04
[52] U.S. Cl. .................. 264/83; 264/143; 264/172.15; 264/210.8; 264/211.14; 264/211.17; 264/237
[58] Field of Search .................... 264/83, 172.15, 264/211.14, 211.17, 237, 143, 210.8

[56] References Cited

U.S. PATENT DOCUMENTS

| | | |
|---|---|---|
| 2,335,922 | 12/1943 | Dreyfus . |
| 2,715,075 | 8/1955 | Wolinski . |
| 2,715,076 | 8/1955 | Wolinski . |
| 2,715,077 | 8/1955 | Wolinski . |
| 2,904,828 | 9/1959 | Smith . |
| 2,985,995 | 5/1961 | Bunting, Jr. et al. . |
| 3,067,458 | 12/1962 | Dauchert . |
| 3,216,187 | 11/1965 | Chantry et al. . |
| 3,353,211 | 11/1967 | Heijnis . |
| 3,354,250 | 11/1967 | Killoran et al. . |
| 3,361,859 | 1/1968 | Cenzato . |
| 3,364,537 | 1/1968 | Bunting, Jr. et al. . |
| 3,420,724 | 1/1969 | Saunders . |
| 3,428,506 | 2/1969 | Johnstone . |
| 3,436,298 | 4/1969 | Oppenlander et al. . |
| 3,437,725 | 4/1969 | Pierce . |
| 3,484,916 | 12/1969 | Johnstone . |
| 3,505,164 | 4/1970 | Oppenlander . |
| 3,509,013 | 4/1970 | Oppenlander . |
| 3,516,899 | 6/1970 | Saunders . |
| 3,533,904 | 10/1970 | Jurkiewitsch . |
| 3,597,268 | 8/1971 | Smith . |
| 3,601,846 | 8/1971 | Hudnall . |
| 3,616,168 | 10/1971 | Johnstone . |
| 3,663,675 | 5/1972 | Fukuma et al. . |
| 3,693,341 | 9/1972 | Higgins, Jr. . |
| 3,807,917 | 4/1974 | Shimoda et al. . |
| 3,862,265 | 1/1975 | Steinkamp et al. . |
| 3,898,209 | 8/1975 | Watson et al. . |
| 3,900,678 | 8/1975 | Aishima et al. . |
| 3,907,057 | 9/1975 | Reddekopp . |
| 3,907,957 | 9/1975 | Shaffer . |
| 4,035,127 | 7/1977 | Ogasawara et al. . |
| 4,115,620 | 9/1978 | Gupta et al. . |
| 4,134,882 | 1/1979 | Frankfort et al. . |
| 4,193,961 | 3/1980 | Roberts . |
| 4,195,051 | 3/1980 | Frankfort et al. . |
| 4,251,200 | 2/1981 | Parkin . |
| 4,259,399 | 3/1981 | Hill . |

(List continued on next page.)

FOREIGN PATENT DOCUMENTS

| | | |
|---|---|---|
| 279511 | 8/1988 | European Pat. Off. . |
| 391438 | 10/1990 | European Pat. Off. . |
| 445536 | 9/1991 | European Pat. Off. . |
| 552013 | 7/1993 | European Pat. Off. . |
| 591676 | 4/1994 | European Pat. Off. . |
| 1142065 | 9/1937 | France . |
| 1146080 | 11/1957 | France . |
| 4234790 | 4/1993 | Germany . |
| 48-18519 | 3/1973 | Japan . |
| 392416 | 4/1991 | Japan . |
| 34908 | 1/1957 | Luxembourg . |
| 738474 | 10/1955 | United Kingdom . |
| 2121423 | 12/1983 | United Kingdom . |
| 2258869 | 2/1993 | United Kingdom . |

OTHER PUBLICATIONS

English Language abstract of Japanese Document No. 48–18519.
English Language abstract of Japanese Document No. 3–92416.
Derwent Abstract of JP–A–2,041,412.
English Abstract of KR 9208538–B.
English Language abstract of Japanese Document No. 63–168445 to Chisso Corp.
Deopura et al., "A study of Blends of Different Molecular Weights of Polypropylene," *Journal of Applied Polymer Science*. vol. 31, 2145–2155 (1986).
Legare, 1986 TAPPI Synthetic Fibers for Wet System and Thermal Bonding Applications, Boston Park Plaza Hotel & Towers, Boston, MA, Oct. 9–10, 1986, "Thermal Bonding of Polypropylene Fibers in nonwovens", pp. 1–13 and attached Tables and Figures.
Kloos, The Plastic and Rubber Institute, The Conference Department, Fourth International Conference on Polypropylene Fibres and Textiles, East Midlands Conference Centre, Nottinghas, London, UK: Wednesday 23 to Friday 25 Sep. 1987, Dependence of Structure and Properties of Melt Spun Polypropylene Fibers on Molecular Weight Distribution, pp. i and 6/1–6/10.
Fan et al., "Effects of molecular Weight Distribution on the Melt Spinning of Polypropylene Fibers," *Journal of Polymer Engineering*, vol. 5, No. 2 (1985) pp. 95–123.

(List continued on next page.)

*Primary Examiner*—Leo B. Tentoni
*Attorney, Agent, or Firm*—Greenblum & Bernstein P.L.C.

[57] ABSTRACT

Process of producing a polypropylene containing fiber and the resulting fiber and non-woven articles. The process involves the extruding of polypropylene containing material having a broad molecular weight distribution to form a hot extrudate having a surface, and quenching the hot extrudate in an oxidative atmosphere so as to effect oxidative chain scission degradation of the surface to obtain a fiber having a higher average melt flow rate as compared to an average melt flow rate of an inner, non-degraded portion thereof, and containing at least 7 percent of molecules having a molecular weight greater than $5 \times 10^5$.

63 Claims, No Drawings

U.S. PATENT DOCUMENTS

| | | |
|---|---|---|
| 4,296,022 | 10/1981 | Hudson . |
| 4,303,606 | 12/1981 | Roberts . |
| 4,347,206 | 8/1982 | Roberts . |
| 4,361,489 | 11/1982 | Kilsdonk et al. . |
| 4,438,238 | 3/1984 | Fukushima et al. . |
| 4,473,677 | 9/1984 | Pellegrini et al. . |
| 4,477,516 | 10/1984 | Sugihara et al. . |
| 4,480,000 | 10/1984 | Watanabe et al. . |
| 4,500,384 | 2/1985 | Tomioka et al. . |
| 4,511,615 | 4/1985 | Ohta . |
| 4,521,483 | 6/1985 | Sasaki et al. . |
| 4,564,553 | 1/1986 | Pellegrini et al. . |
| 4,578,414 | 3/1986 | Sawyer et al. . |
| 4,592,943 | 6/1986 | Cancian et al. . |
| 4,626,467 | 12/1986 | Hostetter . |
| 4,632,861 | 12/1986 | Vassilatos . |
| 4,634,739 | 1/1987 | Vassilatos . |
| 4,652,484 | 3/1987 | Shiba et al. . |
| 4,680,156 | 7/1987 | Collier . |
| 4,717,325 | 1/1988 | Fujimura et al. . |
| 4,732,809 | 3/1988 | Harris, Jr. et al. . |
| 4,770,925 | 9/1988 | Uchikawa et al. . |
| 4,789,592 | 12/1988 | Taniguchi et al. . |
| 4,795,668 | 1/1989 | Krueger et al. . |
| 4,798,757 | 1/1989 | Modrak et al. . |
| 4,804,577 | 2/1989 | Hazelton et al. . |
| 4,818,587 | 4/1989 | Ejima et al. . |
| 4,828,911 | 5/1989 | Morman . |
| 4,830,904 | 5/1989 | Gessner et al. . |
| 4,837,078 | 6/1989 | Harrington . |
| 4,840,846 | 6/1989 | Ejima et al. . |
| 4,840,847 | 6/1989 | Ohmae et al. . |
| 4,842,922 | 6/1989 | Krupp et al. . |
| 4,851,284 | 7/1989 | Yamanoi et al. . |
| 4,868,031 | 9/1989 | Modrak et al. . |
| 4,874,666 | 10/1989 | Kubo et al. . |
| 4,883,707 | 11/1989 | Newkirk . |
| 4,909,976 | 3/1990 | Cuculo et al. . |
| 4,921,607 | 5/1990 | Langley . |
| 4,938,832 | 7/1990 | Schmalz . |
| 4,997,875 | 3/1991 | Geddes et al. . |
| 5,009,951 | 4/1991 | Ohmae et al. . |
| 5,015,694 | 5/1991 | Milani et al. . |
| 5,025,124 | 6/1991 | Alfredeen . |
| 5,033,172 | 7/1991 | Harrington . |
| 5,045,387 | 9/1991 | Schmalz . |
| 5,066,723 | 11/1991 | Randall, Jr. et al. . |
| 5,082,720 | 1/1992 | Hayes . |
| 5,130,196 | 7/1992 | Nishio et al. . |
| 5,130,317 | 7/1992 | Baader et al. . |
| 5,133,917 | 7/1992 | Jezic et al. . |
| 5,143,779 | 9/1992 | Newkirk et al. . |
| 5,277,974 | 1/1994 | Kubo et al. . |
| 5,281,378 | 1/1994 | Kozulla . |
| 5,294,482 | 3/1994 | Gessner . |
| 5,318,735 | 6/1994 | Kozulla . |
| 5,336,552 | 8/1994 | Strack et al. . |
| 5,372,885 | 12/1994 | Tabor et al. . |
| 5,431,994 | 7/1995 | Kozulla . |
| 5,629,080 | 5/1997 | Gupta et al. . |
| 5,654,088 | 8/1997 | Gupta et al. . |
| 5,705,119 | 1/1998 | Takeuchi et al. . |

OTHER PUBLICATIONS

Jones, The Plastics and Rubber Institute, The Conference Department, Fourth International Conference on Polypropylene Fibers and Textiles, East Midlands Conference Centre, Nottinghas, London,UK: Wednesday 23 to Friday 25 Sep. 1987, "A Study of Resin Melt Flow Rate and Polydispersity Effects on the Mechani–cal Properties of Melt Blown Polypropylene Webs", pp. 1 and 46/1–46/10.

Mahajan et al., "Fibers Spun From Blends of Different Molecular Weights of Polypropylene", *Journal of Applied Polymer Science*, vol., 43, 49–56 (1991).

Durcova et al., "Structure of Photooxidized Polypropylene Fibers", Polymer Science U.S.S.R., vol. 29,. No. 10 (1987), pp. 2351–2357.

Olivieri et al., The Plastics and Rubber Institute, The Conference Dept., Fourth Inter. Conf. on Polypropylene Fibers and Textiles, E. Midlands Conf. Centre, Nottinghas, London, UK: Wed 23–Fri 25 Sep. 1987, pp. 40/1 –40/10.

Catalyst Consultants, Inc., A Select Client Study "Technical Advances in Reactive Processing for Polymer Blends/Alloys Production 1990–2000", Apr. 1990, pp. 107 and one pg. Listing group and one order page.

Tzoganakis et al., Polymer Engineering and Science, Mar. 1989, Vol. 29, No. 6, pp. 390–396, "Effect of Molecular Weight Distribution on the Rheological and Mechanical Properties of Polypropylene".

Prost et al., Makromol, Chem. Macromol. Symp., 23, 173–182 (1989), "influence of Molecular Wight and Spinning Conditions on the Crystalline Morphology of Polypropylene Fibres".

Yamane et al., Polymer Engineering and Science, Jun. 1993, 1983, vol. 23, No. 9, pp. 516–520, Extrusion and Melt Spinning Characteristics of Thermally Degraded Polypropylene.

Lu et al., Journal of Applied Polymer Science, vol. 34, 1521–1539 (1987), "The Influence of Resin Characteristics on the High Speed Melt Spinning of Isotatic Polypropylene. I. Effect of Molecular Weight and Its Distribution on Structure and Mechanical Properties of As–Spun Filaments".

Lu et al., Journal of Applied Polymer Science, vol. 34, 1541–1556 (1987), "The Influence of Resin Characteristics on the High Speed Melt Spinning of Isotatic Polypropylene. II. On–Line Studies of Diameter, Birefringence, and Temperature Profiles".

McDonald et al., *Fiber Producer*, Aug. 1983, pages 38–66.

Derwent Abstract No. WPI ACC No. 13–13421U/10 of SU 326142.

Patent Abstracts of Japan, vol. 008, No. 168 (C–236), Aug. 3, 1984.

Patent Abstracts of Japan, vol. 012, No. 326 (C–525), Sep. 5, 1988.

Patent Abstracts of Japan, vol. 012, No. 338 (C–527), Sep. 12, 1988.

Derwent Abstracts No. WPI Acc No: 84–130971/21, 88–151595/22, 88–158496–23.

Molecular Weight printout, Aug. 14, 1997 pp. 1–6.

English Abstract from Polymer Applications, Week 9333, p. 13, KR–B–9208538, "Production of polypropylene flat yarn by mixing small amount of low molecular weight polypropylene with high molecular weight polypropylene, injecting into a spinneret, melt extruding and further processing".

Seiler and Goller, "Propylene (PP)" *Kunststoffe German Plastics*, 80, 1990, pp. 1085–1092.

Jefferies, R. "Biocomponet Fibers", Merrow Publishing Co. Ltd. England, 1971, pp. 1–70.

Zeichner and Patel, *Proceedings of Second World Congress of Chemical Engineering,* Montreal, vol. 6 (1981), pp. 333–337.

Trent et al., "Ruthenium Tetroxide Staining of Polymers for Election Microscopy" *Macromolecules,* vol. 16, No. 4, 1983.

European Search Report and Annex.

M. Jambrich et al., Faserforschung und Textiltechnik 18 (1967) Heft 2, pp. 103–107, with English translation.

S.E. Ross, Journal of Applied Polymer Science, vol. 9, 1965, pp. 2429–2748.

M. Compostella et al., Angew. Chem, 74, Nr. 16, 1962, pp. 618–624, with English translation.

Krag, The Plastics and Rubber Institute, the Conference Department, Fourth International Conference on Polypropylene Fibres and Textiles, East Midlands Conference Centre, Nottinghas, London, UK: Wednesday 23 to Friday 25 Sep. 1987, "Nonwoven Properties in Relation to Fibre Characteristics", pp. 39/1 –39/9.

PROCESS FOR PRODUCING FIBERS FOR HIGH STRENGTH NON-WOVEN MATERIALS

CROSS-REFERENCE TO RELATED APPLICATIONS

This application is a continuation of application Ser. No. 08/358,884, filed Dec. 19, 1994, now abandoned. The entire disclosure of application Ser. No. 08/358,884 is considered as being part of the disclosure of this application, and the entire disclosure of application Ser. No. 08/358,884 is expressly incorporated by reference herein in its entirety.

This application is related to application Ser. No. 08/003,696, filed Jan. 13, 1993, now U.S. Pat. No. 5,629,080, in the name of Gupta et al., which is a continuation-in-part of application Ser. No. 07/943,190, filed Sep. 11, 1992, abandoned, which is a continuation-in-part of application Ser. No. 07/818,772, filed Jan. 13, 1992; abandoned and application Ser. No. 07/474,897, filed Feb. 5, 1990, abandoned in the name of Kozulla, its continuation application Ser. No. 07/887,416, filed May 20, 1992, now U.S. Pat. No. 5,281,378, its continuation-in-part application Ser. No. 07/683,635, filed Apr. 11, 1991, now U.S. Pat. No. 5,318,735, and its divisional application Ser. No. 07/836,438, filed Feb. 18, 1992, abandoned and its continuation application Ser. No. 07/939,857, filed Sep. 2, 1992, U.S. Pat. No. 5,431,994, the disclosures of which are hereby incorporated by reference in their entirety.

BACKGROUND OF THE INVENTION

1. Field of the Invention

The present invention relates to synthetic fibers used in the manufacture of non-woven fabrics. In particular, the present invention relates to polypropylene fibers, intended for such use, processes of producing polypropylene fibers, compositions for producing polypropylene fibers, non-woven fabrics produced with polypropylene fibers, and articles containing polypropylene fibers. More specifically, the fibers of the present invention are producible using polymer admixtures so as to enable control of desired properties of the fibers.

2. Background Information

The production of polypropylene fibers and filaments usually involves the use of a mix of a single polymer with nominal amounts of stabilizers and/or antioxidants and pigments. The mix is melt extruded into fibers and fibrous products using conventional commercial processes. Non-woven fabrics are typically made by making a web of the fibers, and then thermally bonding the fibers together where they meet. More specifically, staple fibers are converted into non-woven fabrics using, for example, a carding machine, and the carded fabric is thermally bonded. The thermal bonding can be achieved using various heating techniques, including heating with heated rollers and heating through the use of ultrasonic welding.

Conventional thermally bonded non-woven fabrics exhibit good loft and softness properties, but less than optimal cross-directional strength, and less than optimal cross-directional strength in combination with high elongation. The strength of the thermally bonded non-woven fabrics depends upon the orientation of the fibers and the inherent strength of the bond points.

Over the years, improvements have been made in fibers which provide stronger bond strengths. However, further improvements are needed to provide even higher fabric strengths to permit use of these fabrics in today's high speed converting processes for hygienic products, such as diapers and other types of incontinence products. In particular, there is a need for a thermally bondable fiber and a resulting non-woven fabric that possess high cross-directional strength and high elongation.

Further, there is a need to produce thermally bondable fibers that can be produced under varying conditions of draw, by utilizing different draw ratios and temperatures, while achieving superior cross-directional strength, elongation and toughness properties in combination with fabric uniformity and loftiness. In particular, there is a need to obtain fibers that can produce carded, calendared fabrics with cross-directional properties on the order of 650–700 g/in, with an elongation of 140–180%, and a toughness of 480–700 g/in for a 20 g/yd$^2$ fabric bonded at 250 ft/min.

A number of patent applications, as referred to above, have been filed by the present inventor and by the present assignee which are directed to improvements in polymer degradation, spin and quench steps, and extrusion compositions that enable the production of fibers having an improved ability to thermally bond accompanied by the ability to produce non-woven fabric having increased strength, elongation, toughness and integrity.

In particular, the above-referred to Kozulla Application No. 07/474,897, filed Feb. 5, 1990, now abandoned, application Ser. No. 07/887,416, filed May 20, 1992, now U.S. Pat. No. 5,281,378, application Ser. No. 07/683,635, filed Apr. 11, 1991, now U.S. Pat. No. 5,318,735, application Ser. No. 07/836,438, filed Feb. 18, 1992, now abandoned, and Ser. No. 07/939,857, filed Sep. 2, 1992, now U.S. Pat. No. 5,431,994, are directed to processes for preparing polypropylene containing fibers by extruding polypropylene containing material having a molecular weight distribution of at least about 5.5 to form hot extrudate having a surface, with quenching of the hot extrudate in an oxygen containing atmosphere being controlled so as to effect oxidative chain scission degradation of the surface. For example, the quenching of the hot extrudate in an oxygen containing atmosphere can be controlled so as 4o maintain the temperature of the hot extrudate above about 250° C. for a period of time to obtain oxidative chain scission degradation of the surface.

As disclosed in these applications, by controlling the quenching to obtain oxidative chain scission degradation of the surface, the resulting fiber essentially contains a plurality of zones, defined by different characteristics including differences in melt flow rate, molecular weight, melting point, birefringence, orientation and crystallinity. In particular, as disclosed in these applications, the fiber produced by the delayed quench process includes an inner zone identified by a substantial lack of oxidative polymeric degradation, and an outer zone of a high concentration of oxidative chain scission degraded polymeric material, whereby there is an inside-to-outside increase in the amount of oxidative chain scission polymeric degradation. In other words, the quenching of the hot extrudate in an oxygen containing atmosphere can be controlled so as to obtain fibers having a decreasing weight average molecular weight towards the surface of the fiber, and an increasing melt flow rate towards the surface of the fiber. Moreover, the inner, core zone has a melting point and orientation that is higher than the outer surface zone.

Further, the above referred to Gupta et al. application Ser. Nos. 08/003,696, 07/943,190 and 07/818,772 are directed to processes for spinning polypropylene fibers, and the resulting fibers and products made from such fibers. The processes of the Gupta et al. applications include melt spinning a polypropylene composition having a broad molecular weight distribution through a spinnerette to form molten fibers, and quenching the molten fibers to obtain thermally bondable polypropylene fibers.

SUMMARY OF THE INVENTION

It is an object of the present invention to obtain advantages associated with the Kozulla and Gupta et al. inventions described in the above-identified applications under varying conditions, while ensuring the production of thermally bondable fibers capable of producing carded, calendared fabrics with superior cross-directional strength, elongation and toughness. In other words, it is an object of the present invention to provide thermally bondable fiber and resulting non-woven fabric that possess high cross directional strength, as well as high elongation and toughness. Further, it is an object of the present invention to provide a greater bonding window, whereby lower bonding temperatures can be utilized to enable the obtaining of softer nonwoven fabrics.

It is also an object of the present invention to provide a process of producing fibers wherein an admixture of polymers is used, whereby control of desired properties and increase spin continuity is obtained.

It is another object of the present invention to provide a fiber having good toughness with a skin-core structure by controlling the high molecular weight species in correlation with an increase in melt stabilization.

In one aspect of the present invention, it is an object to provide a process for preparing at least one polypropylene containing fiber or filament, comprising extruding a polypropylene admixture having a molecular weight distribution broader than any individual component of the admixture to form at least one hot extrudate having a surface; and quenching the at least one hot extrudate in an oxidative atmosphere so as to effect oxidative chain scission degradation of the surface to obtain a skin-core fiber or filament having a higher average melt flow rate as compared to an average melt flow rate of an inner, non-degraded portion of the at least one fiber or filament corresponding substantially to fiber or filament, the fiber or filament containing at least 7 percent of molecules having a molecular weight greater than $5 \times 10^5$ grams/mole.

Further, it is an object to provide a process for preparing at least one polypropylene containing fiber or filament, comprising extruding an admixture of at least two polypropylene containing materials having a broad molecular weight distribution shifted to at least one of a high molecular weight and a low molecular weight to form at least one hot extrudate having a surface; and quenching the at least one hot extrudate in an oxidative atmosphere so as to effect oxidative chain scission degradation of the surface to obtain a skin-core fiber or filament having a higher average melt flow rate as compared to an average melt flow rate of an inner, non-degraded portion of the at least one fiber or filament corresponding substantially to non-degraded fiber or filament, the fiber or filament containing at least 7 percent of molecules having a molecular weight greater than $5 \times 10^5$.

It is another object of the present invention to provide a process for preparing at least one polypropylene containing fiber or filament, comprising extruding an admixture of at least two polypropylene containing materials having a broad molecular weight distribution to form at least one hot extrudate having a surface; and quenching the at least one hot extrudate in an oxidative atmosphere so as to effect oxidative chain scission degradation of the surface to obtain at least one skin-core fiber or filament having a higher average melt flow rate as compared to an average melt flow rate of an inner, non-degraded portion of the at least one fiber or filament corresponding to substantially non-degraded fiber or filament, the fiber or filament containing at least 9 percent of molecules having a molecular weight greater than $5 \times 10^5$ when the average melt flow rate of the at least one fiber or filament is less than or equal to 27, and containing at least 7 percent of molecules having a molecular weight greater than $5 \times 10^5$ when the average melt flow rate of the at least one fiber or filament is greater than 27.

The polypropylene containing material of the present invention, as noted above, can have a broad molecular weight distribution shifted to a high molecular weight or a low molecular weight; however, it is preferred that the shift be to a high molecular weight. Further, the polypropylene containing material has a molecular weight distribution of at least about 5, preferably at least about 5.5; however, the molecular weight distribution can be at least about 6 or at least about 7. Exemplary melt flow rates of the polypropylene containing material are about 1, 4, 10, 13, 20 or 400, and mixtures thereof.

The average melt flow rate of the at least one fiber or filament is at least about 20 dg/min to a maximum average melt flow rate of about 70. The temperature of the polypropylene containing material being extruded should be about 250° C. to 325° C., more preferably about 275° C. to 320° C.

The polypropylene containing material can contain a melt flow stabilizer and/or antioxidant, which is preferably in an amount effective to maintain at least 7 percent of molecules having a molecular weight greater than $5 \times 10^5$ in the at least one fiber or filament. The melt flow stabilizer and/or antioxidant can comprise about 0.05 to 2.0 percent by weight of the polypropylene containing material, more preferably about 0.02 to 1.0, and, depending upon the molecular weight distribution of the polypropylene containing material, can be present at about 0.03 to 0.07 percent by weight, or about 0.05 to 0.06 percent by weight of the polypropylene containing material. The melt flow stabilizer and/or antioxidant is preferably selected from phenylphosphites and hindered phenolics. For example, the phenylphosphites are stabilizers which function well at high temperatures preventing reactions which cause free radicals.

The average melt flow rate of the at least one fiber or filament is preferably about 20 to 200% higher than the melt flow rate of the non-degraded portion of the at least one fiber or filament.

The quenching of the at least one hot extrudate in an oxidative atmosphere to effect oxidative chain scission degradation of the surface of the at least one fiber or filament can include controlling the quenching rate of the hot extrudate, which includes delaying of the quenching of the at least one extrudate. In one embodiment, the oxygen containing quenching atmosphere can comprise a cross-blow quench, with an upper portion of the cross-blow quench being blocked. Further, the quenching of the at least one hot extrudate in an oxidative atmosphere can be controlled to maintain the temperature of the at least one hot extrudate above about 250° C. for a period of time to obtain oxidative chain scission degradation of the surface.

The present invention is also directed to polypropylene fibers or filaments produced by the above processes. Further, it is an object of the present invention to provide a polypropylene fiber comprising a skin-core structure having a surface zone comprising an external surface of the fiber, the surface zone comprising a high concentration of oxidative chain scission degraded polymeric material as compared to an inner, non-degraded portion; and at least 7 percent of molecules having a molecular weight greater than $55 \times 10^5$.

Moreover, it is an object of the present invention to provide a polypropylene fiber, comprising a skin-core structure having a surface zone comprising an external surface of the fiber, the surface zone comprising a high concentration of oxidative chain scission degraded polymeric material as compared to an inner, non-degraded portion; and at least 9 percent of molecules having a molecular weight greater than $5 \times 10^5$ when an average melt flow rate of the fiber is less than or equal to 27, and at least 7 percent of molecules having a molecular weight greater than $5 \times 10^5$ when the average melt flow rate of the fiber is greater than 27.

The average melt flow rate of the fiber according to the present invention is preferably about 20–50, and can be at least about 20, at least about 25 and at least about 30. This fiber can contain any combination of melt flow stabilizers and/or antioxidants as discussed with respect to the process of producing the fibers. Further, the surface zone can have a thickness of greater than to equal to 0.5 $\mu$m.

Further, the present invention is directed to non-woven materials comprising fibers according to the present invention thermally bonded together, as well as to hygienic products comprising at least one absorbent layer, and at least one non-woven fabric comprising fibers according to present invention thermally bonded together. The hygienic product can comprise a diaper having an outer impermeable layer, an inner non-woven fabric layer, and an intermediate absorbent layer.

Because the fiber of the present invention provides superior bond strength compared with conventional polypropylene fiber, the non-woven material thus produced exhibits superior cross-directional tensile properties. Further, non-woven material produced with the fiber of the present invention has superior elongation, uniformity, loftiness, white coloration and softness, while exhibiting the above-noted superior mechanical properties.

DETAILED DESCRIPTION OF THE PREFERRED EMBODIMENTS

As used herein, polypropylene is utilized in its ordinary commercial meaning wherein the polypropylene is a substantially linear molecule. Further, as used herein, a polypropylene composition includes a material which contains a broad molecular weight distribution of linear polypropylene to enable the obtaining of fibers and filaments which have superior spinning and thermal bonding characteristics. Moreover, the fibers and filaments of the present invention provide non-woven materials of exceptional cross-directional strength, elongation, uniformity, loftiness and softness, by utilizing the disclosed polypropylene compositions including the disclosed linear polypropylene components having a broad molecular weight distribution when subjected to delayed quenching, whether or not other components are present therein.

Further, as used herein, polypropylene includes homopolymers of propylene, various polymers containing propylene, such as copolymers and terpolymers of propylene, and polypropylene mixtures (including blends and alloys produced by mixing separate batches or forming a blend in situ) with other substances and polymers. For example, the polymer can comprise copolymers of propylene, and these copolymers can contain various components. Preferably, such copolymers include up to about 10 weight % of at least one of ethylene and butene, but can contain varying amounts thereof depending upon the desired fiber or filament.

By practicing the process of the present invention, utilizing spin compositions according to the present invention, fibers and filaments can be obtained which have superior spinning and thermal bonding characteristics. Moreover, the fibers and filaments of the present invention provide non-woven materials of exceptional cross-directional strength, toughness, elongation, uniformity, loftiness and softness, by utilizing a material which contains a broad molecular weight distribution of linear polypropylene utilizing delayed quenching, whether or not other components are present therein.

The present invention is directed to various forms of fibers, including filaments and staple fibers. These terms are used in their ordinary commercial meanings. Typically, herein, filament is used to refer to the continuous fiber on the spinning machine; however, as a matter of convenience, the terms fiber and filament are used interchangeably herein. "Staple fiber" is used to refer to cut fibers or filaments. Preferably, for instance, staple fibers for non-woven fabrics useful in diapers have lengths of about 1 to 3 inches, more preferably about 1.25 to 2 inches.

Further, a number of procedures are used to analyze and define the composition and fiber of the present invention, and various terms are used in defining characteristics of the composition and fiber. These will be described below.

Initially, it is noted that the composition that is to be extruded, such as through a spinnerette, to produce filaments is generally referred to as the extrudable composition. Further, while fiber, filament and staple fiber, as discussed above, have different meanings, as a matter of convenience, these various terms will be collectively referred to as fiber.

Size exclusion chromatography (SEC.) is used to determine the molecular weight distribution of the polypropylene. In particular, high performance size exclusion chromatography of the extrudable composition and the fibers is performed at a temperature of 145° C. using a Waters 150-C ALC/GPC high temperature liquid chromatograph with differential refractive index (Waters) detection. To control temperature, the column compartment, detector, and injection system are thermostatted at 145° C., and the pump is thermostatted at 55° C. The mobile phase employed is 1,2,4-trichlorobenzene (TCB) stabilized with butylated hydroxytoluene (BHT) at 0.04 mg/mL, with a flow rate of 0.5 ml/min. The column set includes two Polymer Laboratories PL Gel mixed bed columns and 500 angstrom columns. To perform the chromatographic analysis, the samples are dissolved in TCB by heating to 175° C. for two hours followed by two additional hours of dissolution at 145° C. Moreover, the samples are not filtered prior to the analysis. All molecular weight data is based on a polypropylene calibration curve obtained from a universal transform of an experimental polystyrene calibration curve. The universal transform employs empirically optimized Mark-Houwink coefficients of $\alpha=0.710$ and $K=0.0160$.

The term "broad molecular weight distribution" is here defined as dry polymer pellet, flake or grain preferably having an MWD value (i.e., Wt.Av.Mol.Wt./No.Av.Mol.Wt.) of at least about 5.0, preferably at least about 5.5, more preferably at least about 6.

The dynamic shear properties of the polymeric materials of the present invention are determined by subjecting a small polymeric sample to small amplitude oscillatory motion in the manner described by Zeichner and Patel, *Proceedings of Second World Congress of Chemical Engineering, Montreal,* Vol. 6, pp. 333–337 (1981), incorporated herein by reference. Specifically, the sample is held between two parallel plates of 25 millimeters in diameter at a gap of two millimeters. The top plate is attached to a dynamic motor while the bottom plate is attached to a 2000 gm-cm torque transducer of a Rheometrics® Dynamic Spectrometer or Analyzer. The test temperature is held at 200° C. While keeping the bottom plate stationary, a small amplitude oscillatory motion is imposed on the top plate sweeping the frequency range from 0.1 to 500 radian/second. At each frequency, after the transients have died out, the dynamic stress response is separable into in-phase and out-of-phase components of the shearing strain. The dynamic modulus, G', characterizes the in-phase component while the loss modulus, G", characterizes the out-of-phase component of the dynamic stress. For high molecular weight polyolefins, such as polypropylenes, it is observed that these moduli crossover or coincide at a point (a certain modulus) when measured as a function of frequency. This crossover modulus is characterized as Gc, and the crossover frequency is characterized by Wc.

The polydispersity index is defined by $10^6$/crossover modulus, and is found to correlate with the molecular weight distribution, Mw/Mn. The crossover frequency correlates inversely with the weight average molecular weight, Mw, for polypropylenes.

Further treatment of Rheometric dynamic spectroscopy data can be carried out to calculate a viscoelastic constant. The viscoelastic constant (VC) is defined according to the equation $VC = \eta_o/(Gc/Wc)^{1.21}$, where "$\eta_o$ is the zero shear viscosity in poise, and "Gc/Wc" is the ratio of crossover modulus to crossover frequency in poise, that is (dyne) (sec)/cm². The values of Gc and Wc are determined utilizing the dynamic shear procedure described above. However, the zero shear viscosity is determined utilizing a low shear steady shear procedure in which a cone and plate fixture are used as the platens instead of the two parallel plates in the dynamic shear procedure. More specifically, the cone has a cone angle of 0.1 radian, and both the cone and the plate are 25 mm in diameter. The test temperature is held at 200° C., as with the dynamic shear procedure. While maintaining the bottom plate stationary, a constant rotational motion is imposed on the top cone at a constant shear rate. After an elapsed time, the stress measured by the transducer maintains a constant value. The viscosity is computed from this steady stress, and the imposed shear rate. The zero shear viscosity, $\eta_o$, is defined as the viscosity of a high molecular weight polymer in which the viscosity is invariant as a function of shear rate. The zero shear viscosity is measured by performing the shear sweep from a shear rate of 0.001 $sec^{-1}$ to 3.0 $sec^{-1}$. The zero shear viscosity is obtained in the low shear rate region, and it is the viscosity that does not vary with shear rate.

The melt flow rate (MFR) as described herein is determined according to ASTM D-1238 (condition L;230/2.16).

The spun fiber obtained in accordance with the present invention can be continuous and/or staple fiber of a monocomponent or bicomponent type, and preferably falls within a denier per filament (dpf) range of about 0.5–30, more preferably is no greater than about 5, and preferably is between about 0.5 and 3.0.

Another test procedure of interest, especially in evaluating the ability of a fiber to thermally bond, consists of the microfusion analysis of residue using a hot stage test. This procedure is used to examine for the presence of a residue following axial shrinkage of a fiber during heating, with the presence of a higher amount of residue directly correlating with the ability of a fiber to provide good thermal bonding. In this hot stage procedure, a suitable hot stage, such as a Mettler FP52 low mass hot stage controlled via a Mettler FP5 control processor, is set to 145° C. A drop of silicone oil is placed on a clean microscope slide. Fibers are cut into ½ mm lengths from three random areas of filamentary sample, and stirred into the silicone oil with a probe. The randomly dispersed sample is covered with a cover glass and placed on the hot stage, so that both ends of the cut fibers will, for the most part, be in the field of view. The temperature of the hot stage is then raised at a rate of 3° C./minute to 164° C. At approximately 163° C., the fibers shrink axially, and the presence or absence of trailing residues is observed. When the temperature reaches 164° C., the heating is stopped and the temperature reduced rapidly to 145° C. The sample is then examined through a suitable microscope, such as a Nikon SK-E trinocular polarizing microscope. Preferably, a photograph of a representative area is taken to obtain a still photo reproduction using, for example, a MTI-NC70 video camera equipped with a Pasecon videotube and a Sony Up-850 B/W videographic printer. A rating of "good" is used when the majority of fibers leave residues. A rating of "poor" is used when only a few percent of the fibers leave residues. Other comparative ratings are also available, and include a rating of "fair" which falls between "good" and "poor", a rating of "very good" which is positioned above "good", and a rating of "none" which, of course, falls below "poor".

The substantially non-uniform morphological structure of the skin-core fibers according to the present invention can be characterized by transmission electron microscopy (TEM) of ruthenium tetroxide ($RuO_4$)-stained fiber thin sections. In this regard, as taught by Trent et al., in *Macromolecules,* Vol. 16, No. 4, 1983, "Ruthenium Tetroxide Staining of Polymers for Electron Microscopy", which is hereby incorporated by reference in its entirety, it is well known that the micromorphology of polymeric materials is dependent on their heat treatment, composition, and processing, and that, in turn, mechanical properties of these materials such as toughness, impact strength, resilience, fatigue, and fracture strength can be highly sensitive to morphology. Further, this article teaches that transmission electron microscopy is an established technique for the characterization of the structure of heterogeneous polymer systems at a high level of resolution; however, it is often necessary to enhance image contrast for polymers by use of a staining agent. Useful staining agents for polymers are taught to include osmium tetroxide and ruthenium tetroxide. For the staining of the filaments and fibers of the present invention, ruthenium tetroxide is the preferred staining agent.

In the morphological characterization of the present invention, samples of filaments or fibers are stained with aqueous $RuO_4$, such as a 0.5% (by weight) aqueous solution of ruthenium tetroxide obtainable from Polysciences, Inc., overnight at room temperature. (While a liquid stain is utilized in this procedure, staining of the samples with a gaseous stain is also possible.) Stained fibers are embedded in Spurr epoxy resin and cured overnight at 60° C. The embedded stained fibers are then thin sectioned on an ultramicrotome using a diamond knife at room temperature to obtain microtomed sections approximately 80 nm thick, which can be examined on conventional apparatus, such as a Zeiss EM-10 TEM, at 100 kV. Energy dispersive x-ray analysis (EDX) was utilized to confirm that the $RuO_4$ had penetrated completely to the center of the fiber.

Fibers that are produced using the delayed quench methods according to the present invention show an enrichment of the ruthenium (Ru-residue) at the outer surface region of the fiber cross-section to a depth of about 1 to 1.5 μm with the cores of the fibers showing a much lower ruthenium content. Intermediate zones are also evident in these fibers. Fibers that are produced without the delayed quench, show a discontinuity on the surface of less than 0.5 μm.

The polypropylene of the present invention comprises an admixture which includes either a mechanical blend of at least two independently produced polymer materials, or an intimate blend of polymer materials. In this regard, the polypropylene used in the extrudable composition of the present invention preferably comprises a blend of different polypropylenes that are blended to obtain a broad mixture of molecular weights. The polypropylene in the extrudable composition can be skewed either to a higher molecular weight or a lower molecular weight, and can be modified in any desired manner so as to include a high percentage of high molecular weight molecules, such as at least about 12 percent of the molecules having a molecular weight greater than $5 \times 10^5$. For example, in a preferred embodiment, the polypropylene can include a high percentage of high molecular weight molecules, such as at least about 14 percent of molecules having a molecular weight greater than $5 \times 10^5$.

As an alternative to blending separate polymers to obtain the broad molecular weight composition of the present invention, whether or not skewed to a high or low molecular weight, the polypropylene in the extrudable composition can be made in situ by polymerizing propylene with or without ethylene or butene by known multi-reactor procedures, such as disclosed in Seiler and Goller, "Propylene (PP)," *KUNST-STOFFE* 80 (1990) 10, pages 1085–1092, the disclosure of which is incorporated herein by reference.

According to the present invention, the starting composition preferably has a MFR of about 5 to 35 dg/minute, so that it is spinnable at temperatures within the range of about 250° C. to 325° C., preferably about 275° C. to 320° C.

The oxidizing environment can comprise air, ozone, oxygen, or other conventional oxidizing environment, at a heated or ambient temperature, downstream of the spinnerette. The temperature and oxidizing conditions at this location must be maintained to ensure that sufficient oxygen diffusion is achieved within the fiber so as to effect oxidative chain scission within at least a surface zone of the fiber to obtain an average melt flow rate of the fiber of at least about 20, 25 or 30, up to a maximum of about 70.

The process for making the fiber of the present invention can be used in both a two step "long spin" process, as well as in a one step "short spin" process, as disclosed in the above-described Kozulla and Gupta et al. applications, and preferably comprises a two-step "long spin" process. For example, the long spin process involves first melt-extruding fibers at typical spinning speeds of 500 to 1500 meters per minute through spinnerettes including approximately 50–4,000, preferably approximately 3,000–3,500 holes. Typically, in a second step run at 100 to 250 meters per minute, these fibers are then drawn, crimped, and cut into staple fiber. The one-step short spin process involves conversion from polymer to staple fibers in a single step where typical spinning speeds are in the range of 50 to 200 meters per minute. The productivity of the one-step process is increased with the use of about 5 to 20 times the number of capillaries in the spinnerette compared to that typically used in the long spin process. For example, spinnerettes for a typical commercial "long spin" process would include approximately 50–4,000, preferably approximately 3,000–3,500 capillaries, and spinnerettes for a typical commercial "short spin" process would include approximately 500 to 100,000 capillaries preferably, about 30,000–70,000 capillaries. Typical temperatures for extrusion of the spin melt are about 250° C. to 325° C., preferably 275° C. to 320° C.

In making the fiber in accordance with the present invention, at least one melt stabilizer and/or antioxidant is mixed with the extrudable composition. The melt stabilizer and/or antioxidant is preferably mixed in a total amount with the polypropylene to be made into a fiber in an amount ranging from about 0.005–2.0 weight % of the extrudable composition, preferably about 0.03–1.0 weight %, and more preferably about 0.03 to 0.06 weight% in order to prevent loss of high molecular weight molecules in the polypropylene during extrusion. Such stabilizers and antioxidants are well known in polypropylene-fiber manufacture and include phenylphosphites, such as IRGAFOS 168 (available from Ciba Geigy Corp.), ULTRANOX 626 (available from General Electric Co.), and SANDOSTAB P-EPQ (available from Sandoz Chemical Co.); and hindered phenolics, such as IRGANOX 1076 (available from Ciba Geigy Corp.) and CYANOX 1790 (available from American Cyanamid Co.); and N,N'-bis-piperidinyl diamine-containing materials, such as CHIMASSORB 119 and CHIMASSORB 944 (available from Ciba Geigy Corp.). These melt stabilizers and/or antioxidants can be used in lower concentrations when the percentage of high molecular weight molecules in the polypropylene to be extruded is relatively high, and in correspondingly lower concentrations as the percentage of high molecular weight molecules decreases. For example, for polypropylene having less than about 14 percent of molecules having a molecular weight greater than $5 \times 10^5$, the concentration of melt stabilizer and/or antioxidant is preferably about 0.05 to 0.1 weight %; whereas, for higher percentages of high molecular weight species, the concentration of melt stabilizer and/or antioxidant is preferably about 0.02 to 0.05 weight %.

The stabilizer and/or antioxidant can be added to the extrudable composition in any manner to provide the desired concentration.

Optionally, whiteners, such as titanium dioxide, in amounts up to about 2 weight %, antacids such as calcium stearate, in amounts ranging from about 0.05–0.2 weight %, colorants, in amounts ranging from 0.01–2.0 weight %, and other well known additives can be included in the fiber of the present invention. Wetting agents, such as disclosed in U.S. Pat. No. 4,578,414, incorporated herein by reference, are also usefully incorporated into the fiber of the present invention.

In making the fiber of the present invention, the polypropylene to be made into a fiber can include polypropylene compositions as taught in Gupta et al. application Ser. No. 08/003,696, filed Jan. 13, 1993, now U.S. Pat. No. 5,629,080, application Ser. No. 07/943,190, filed Sep. 11, 1992, now abandoned, and application Ser. No. 07/818,772, filed Jan. 13, 1992, now abandoned, which have been incorporated by reference herein. However, other polypropylene containing materials can be used provided that the composition that is subjected to extrusion and delayed quenching in an oxidative environment provides a fiber having a higher average melt flow rate as compared to an average melt flow rate of an inner, non-degraded portion of the fiber and contains at least 7 percent of molecules having a molecular weight greater than $5 \times 10^5$. For example, the average melt flow rate of the fiber can be at least about 20% higher than the non-degraded portion of the fiber (fiber not subjected to delayed quenching in an oxidative environment), and is preferably about 20–200% higher.

The at least 7 percent of molecules having a molecular weight greater than $5 \times 10^5$ can be obtained in the fiber by using different starting polypropylene materials. For example, the broad molecular weight distribution polypropylene material can contain varying amounts of high molecular weight molecules and melt flow stabilizer and/or antioxidant. By manipulation of the starting composition, both a desired average melt flow rate of the fiber, which is preferably about 20–50, and a high concentration of high molecular weight molecules can be obtained.

As previously discussed, the extrudable composition of the present invention can comprise one polypropylene containing a broad molecular weight distribution and having a sufficient number of high molecular weight molecules to obtain the fiber according to the present invention, as well as mixtures of different polypropylenes of the same or different melt flow rates. For example, the starting composition can include various combinations of polypropylenes, and these polypropylenes can include at least one polypropylenes having a melt flow rate such as about 1, 4, 10, 13, 20 and 400. Of course, the invention is not limited to these melt flow rates, but can include any combination of melt flow rates wherein the starting composition has a broad molecular weight distribution and can be spun using oxidative quench conditions to achieve the fiber according to the present invention.

It is also preferred that the fiber of the present invention have a tenacity no greater than about 2.5 g/denier, and a fiber elongation of at least about 250%, as measured on individual fibers using a FAFEGRAPH tensile tester with a fiber gauge length of about 1.25 cm and an extension rate of about 200%/min (average of 10 fibers tested). Fiber tenacity is defined as the breaking force divided by the denier of the fiber, while fiber elongation is defined as the % elongation to break.

As discussed above, the present invention provides non-woven materials including the fibers according to the present invention thermally bonded together. By incorporating the fibers of the present invention into non-woven materials, non-woven materials of exceptional cross-directional strength and percent elongation can be obtained. These non-woven materials can be used as at least one layer in various products, including hygienic products, such as sanitary napkins, incontinence products and diapers, comprising at least one liquid absorbent layer and at least one non-woven material layer of the present invention and/or incorporating fibers of the present invention thermally bonded together. Further, as previously indicated, the articles according to the present invention can include at least one liquid impermeable layer. For example, a diaper incorporating a non-woven fabric of the present invention would include, as a preferred embodiment, an outermost impermeable layer, an inner layer of the non-woven material, and at least one intermediate absorbent layer. Of course, a plurality of non-woven material layers and absorbent layers can be incorporated in the diaper (or other hygienic product) in various orientations, and a plurality of outer impermeable layers can be included for strength considerations.

In order to more clearly describe the present invention, the following non-limiting examples are provided. All parts and percentages in the examples are by weight unless indicated otherwise.

EXAMPLE 1

Fibers were individually prepared using a two step process. In the first step, blended compositions of linear isotactic polypropylene flake (obtained from Himont, Inc.), and identified in Table 1 as "A" to "D") were prepared by tumble mixing blends of combinations of these polymers to form blends 1–7 as shown in Table 2.

The admixtures contained from 75 to 160 ppm of a primary antioxidant, Irganox 1076 available from Ciba-Geigy Corp. In addition, 300 to 600 ppm of a secondary antioxidant, Irgafos 168 available from Ciba-Geigy Corp., were added to each blend, with Table 2 indicating the amounts of stabilization additives.

The mix was then heated, extruded and spun into a circular cross section fiber at a melt temperature of about 295° to 300° C. Prior to melting, the mixture was blanketed with nitrogen. The melt was extruded through standard 1068 hole spinnerettes and taken up at a rate of 820 meters per minute to prepare spin yarn having a denier per filament of 3.0, (3.3 dtex). The fiber threadlines in the quench box were exposed to an ambient air quench of about 250 ft/min (cross blow) with 20 millimeters of the quench nearest the spinnerette blocked off from the cross blow area with a shroud to delay the quenching step. Quenching was also performed under similar conditions but without blocking, e.g., without a shroud, so as to obtain comparative fibers prepared without delayed quenching.

In the second step, the resulting continuous filaments were collectively drawn using three sets of mechanical draw ratio and roll temperature conditions; namely (A) 1.4× draw ratio with draw rolls heated to 40° C. and 110° to 125° C., (B) 1.65× draw ratio with similarly heated draw rolls, and (C.) 1.4× (or in one case 1.65×) with ambient temperature (25° C.) draw rolls. The drawn tow was crimped at about 30 crimps per inch (118 crimps per 10 cm) using a stuffer box with steam.

During each step, the fiber was coated with a finish mixture (0.4 to 1.2 weight % finish on fiber by weight) of an ethoxylated fatty acid ester and an ethoxylated alcohol phosphate (from George A. Ghoulston Co., Inc., Monroe, N.C., under the name Lurol PP 912), and cut to 1.5 inches (38 mm).

Fibers of each blend composition and each draw condition were then carded into conventional fiber webs at 250 feet per minute (76 meters/min) using equipment and procedures discussed in Legare, 1986 TAPPI Synthetic Fibers for Wet System and Thermal Bonding Applications, Boston Park Plaza Hotel & Towers, Boston, Mass. Oct. 9–10, 1986, "Thermal Bonding of Polypropylene Fibers in Nonwovens", pages 1–13 and attached Tables and Figures. Specifically, three-ply webs of staple were identically oriented and stacked (primarily in the machine direction), and bonded using a calendar roll having diamond bond points with a total bond area of about 20%, and a smooth roll at roll temperatures ranging from 148° C. to 172° C. and roll pressures of 240 pounds per linear inch (420 Newtons per linear centimeter) to obtain test non-wovens weighing nominally 20 grams per square yard (23.9 grams per square meter).

Test strips of each non-woven, 1 inch×7 inches (25 mm×178 mm) were then identically tested* for cross directional (CD) strength, elongation, and toughness (defined as energy to break fabric based on area under stress-strain curve values).

The composition and characterization of each blend is shown in Table 2. Characterizations of fiber spun from each composition are shown in Tables 3 and 4, with Table 3 characterizing the spun fiber produced without a shroud and Table 4 characterizing the spun fiber produced using a delayed quench. Tables 5, 6 and 7 contain the draw conditions for each spin fiber shown in Table 4. Tables 8, 9 and 10 show fabric cross directional properties obtained for each sample. The strength values and the toughness values are normalized for a basis weight of 20 grams per square yard (23.9 grams per square meter). The fabric elongation values are not normalized. A conversion of 1 g-in/in is equal to 0.49 mJ/5 cm was used to convert to mJ/5 cm units in the tables.

The control samples are those made from blends 6 and 7.

Cross-sections of the fibers according to the invention in blends 2 and 3 show a narrow transition region, with a course texture of 1 to 2 $\mu$m between the sheath and core regions. The control fiber of blend 7, which provided lower cross-direction strength properties shows a texture inside the 1–1.5 $\mu$m sheath region (including the entire core) that is similar to the transition region.

TABLE 1

INDIVIDUAL POLYMER PROPERTIES

| POLYMER[1] | PLASTOMETER[2] MFR dg/min | RDS[3] MFR | RDS PI | RDS MWD | SEC[4] $M_n \times 10^{-3}$ g/mol | SEC $M_w \times 10^{-3}$ g/mol | SEC MWD | WT % > $1 \times 10^6$ g/mol | WT % > $5 \times 10^5$ g/mol |
|---|---|---|---|---|---|---|---|---|---|
| A | 4  | 4.2  | 4.38 | 5.0 | 71.2 | 330 | 4.6  | 6.59 | 17.59 |
| B | 4  | 6.4  | 5.90 | 6.5 | 68.6 | 297 | 4.3  | 5.28 | 15.26 |
| C | 10 | 11.6 | 4.68 | 5.3 | 23.5 | 274 | 11.7 | 4.99 | 13.59 |
| D | 20 | 23.1 | 4.62 | 5.2 | 31.1 | 237 | 7.6  | 3.92 | 10.94 |

[1] All polymers are isotactic (>95% xylene insolubles) polypropylene resins obtained commercially from Himont, Inc.
[2] All plastometer measurements were made using a Tinius-Olsen melt flow analyzer according to ASTM-1238 procedures.
[3] RDS refers to rheometric dynamic spectrometer measurements.
[4] SEC refers to size exclusion chromatography measurements of molecular weight averages and percentages (by weight) of high molecular weight species. $M_n$ is number average molecular weight $M_w$ is weight average molecular weight MWD is $M_w/M_n$. (Wt % > $1 \times 10^6$ g/mol) and (wt % > $5 \times 10^5$ g/mol) are cumulative weight percentages of the molecules in the resin or fiber that exceed $1 \times 10^6$ and $5 \times 10^5$ g/mol, respectively.

TABLE 2

COMPOSITIONS

| BLEND | %A | %B | %C | %D | wt. % Irgafos 168 | wt. % Irganox 1076 | PLASTOMETER MFR dg/min | RDS PI | SEC $M_n \times 10^{-3}$ g/mol | SEC $M_w \times 10^{-3}$ g/mol | SEC MWD | wt % > $1 \times 10^6$ g/mol | wt % > $5 \times 10^5$ g/mol |
|---|---|---|---|---|---|---|---|---|---|---|---|---|---|
| 1 | 30 | 0  | 60  | 10 | .03 | .011  | 10.7 | 5.3 | 47.5 | 299 | 6.3  | 5.44 | 14.52 |
| 2 | 70 | 0  | 0   | 30 | .03 | .016  | 8.4  | 4.5 | 43.3 | 307 | 7.1  | 5.76 | 15.45 |
| 3 | 0  | 30 | 0   | 70 | .06 | .014  | 15.4 | 4.6 | 35.7 | 274 | 7.7  | 4.66 | 12.64 |
| 4 | 0  | 10 | 60  | 30 | .06 | .010  | 13.8 | 4.8 | 39.9 | 273 | 6.8  | 4.76 | 13.20 |
| 5 | 0  | 0  | 100 | 0  | .05 | .0075 | 10.0 | 4.7 | 21.0 | 293 | 14.0 | 5.65 | 14.70 |
| 6 | 0  | 30 | 60  | 10 | .03 | .011  | 10.3 | 4.5 | 24.3 | 267 | 11.0 | 4.67 | 13.49 |
| 7 | 0  | 70 | 0   | 30 | .03 | .016  | 9.6  | 4.3 | 48.1 | 280 | 5.8  | 4.94 | 14.31 |

TABLE 3

PROPERTIES OF FIBER WITHOUT DELAYED QUENCH

| BLEND | PLAST MFR dg/min. | RDS MFR dg/min. | RDS PI | SEC $M_n \times 10^{-3}$ g/mol | SEC $M_w \times 10^{-3}$ g/mol | SEC $M_z \times 10^{-3}$ g/mol | SEC MWD | WT % > $1 \times 10^6$ g/mol | WT % > $5 \times 10^5$ g/mol | VISCO-ELASTIC CONSTANT |
|---|---|---|---|---|---|---|---|---|---|---|
| 1 | 11.0 | 11.0 | 4.2 | 25.3 | 240 | 876 | 9.5  | 3.52 | 11.64 | 1.39 |
| 2 | 9.7  | 10.2 | 4.1 | 37.6 | 249 | 893 | 6.6  | 3.69 | 12.11 | 1.36 |
| 3 | 17.8 | 18.4 | 4.0 | 31.2 | 209 | 654 | 6.7  | 2.52 | 9.36  | 1.52 |
| 4 | 15.1 | 16.4 | 4.2 | 20.3 | 218 | 841 | 10.7 | 2.88 | 9.91  | 1.38 |
| 5 | 12.8 | 13.0 | 4.1 |      |     |     |      | —    | —     |      |
| 6 | 14.7 | 14.7 | 3   | 36.8 | 211 | 569 | 5.7  | 2.34 | 9.65  | 1.39 |
| 7 | 14.3 | 14.9 | 3.5 | 30.3 | 209 | 598 | 6.9  | 2.10 | 9.17  | 1.33 |

| BLEND | VISCOSITY ZERO-SHEAR POISE | MICRO[6] FUSION RESIDUE | SHEATH[7] THICKNESS $\mu$m | %[8] SMECTIC CONTENT | ELONG-[9] ATION % | TOTAL[10] ORIENTATION BY X-RAY | HELICAL[11] ORIENTATION BY ART-1R $P_x$ | HELICAL[12] ORIENTATION BY TRANSMISSION 1R (BULK) $P_x$ |
|---|---|---|---|---|---|---|---|---|
| 1 | 2.52 | POOR |      | 15.5 | 475 | .272 | 65 |    |
| 2 | 2.38 | POOR | <0.5 | 19.6 | 500 | .290 | 63 | 77 |
| 3 | 1.19 | NONE | <0.5 | 14.0 | 426 | .259 | 66 | 75 |
| 4 | 2.38 | NONE |      | 17.8 | 491 | .233 | 69 |    |
| 5 |      |      |      |      |     |      |    |    |

TABLE 3-continued

PROPERTIES OF FIBER WITHOUT DELAYED QUENCH

| 6 | 1.60 | POOR |       | 16.5 | 425 | .275 | 73 |    |
| 7 | 1.38 | POOR | <0.5  | 14.5 | 396 | .291 | 74 | 78 |

[5] $M_z$ is the Z average molecular weight
[6] Microfusion residue refers to the presence of a residue left after a melted fiber has shruck axially due to conductive heating at a rate of 3° C./minutes.
[7] The Sheath thickness as delineated by ruthenium tetroxide staining refers to the discontinuity shown by the stained region on the outer edge of fiber.
[8] Percent smectic content refers to the percentage of semiordered crystalline regions. "Smectic" refers to type of crystallization in which right and left-handed helices are considered to by randomly placed to one another to give a pseudohexagonal structure. The crystal lattice is considered to be deformed and the unit cell edges are replaced by statistically determined vectors in both length and direction*. As such, the "smectic" content is a measure of the intermediate order to polypropylene crystallites. The smectic content was measured by wide angle x-ray techniques.
[9] Fiber elongation is measured as the apparent % elongation to break. A fafegraph tensile tester with a fiber gauge length of about 1.25 cm and an extension rate of 200%/min was used. The value in the table is the average of 10 fibers tested.
[10]* Total orientation by x-ray is measured by evaluating azimuthal scans of the 110 and the 040 planes and reducing the Lorentzians to Hermann's orientation functions. From G. Farrow, Journel of Applied Polymer Science, Vol. 9, p. 1227–1232. (1965)
[11] The helical orientation, $P_x$, is the percent of helices oriented in the fiber axis direction as measured by attenuated total reflectance infrared spectroscopy (ATR-1R) of regions less than about 4 microns from the fiber surface.
[12] The helical orientation, $P_x$, is the percent of helices oriented in the fiber axis direction as measured by transmission IR spectroscopy of the bulk of the fiber-all regions of the cross-section are included in the data.

TABLE 4

PROPERTIES OF FIBER WITH DELAYED QUENCH

| BLEND | PLAST MFR (dg/min) | RDS MFR (dg/min) | RDS PI | SEC Mn × $10^{-3}$ (g/mol) | SEC $M_w$ × $10^{-3}$ (g/mol) | SEC $M_z$ × $10^{-3}$ (g/mol) | SEC MWD | WT % > 1 × $10^6$ (g/mol) | WT % > 5 × $10^5$ (g/mol) | VISCO-ELASTIC CONSTANT |
|---|---|---|---|---|---|---|---|---|---|---|
| 1 | 24.0 | 23.6 | 4.1 | 35.2 | 207 | 657 | 5.9 | 2.49 | 9.26 | 1.60 |
| 2 | 21.6 | 19.5 | 3.9 | 34.3 | 221 | 809 | 6.4 | 2.93 | 10.02 | 1.56 |
| 3 | 30.1 | 33.5 | 3.9 | 19.2 | 182 | 526 | 9.5 | 1.77 | 7.37 | 1.57 |
| 4 | 28.8 | 29.1 | 4.0 | 20.1 | 193 | 613 | 9.6 | 2.09 | 8.18 | 1.61 |
| 5 | 27.4 | | | | | | | | | |
| 6 | 25.9 | 25.6 | 3.7 | 26.3 | 189 | 544 | 7.2 | 1.79 | 7.67 | 1.52 |
| 7 | 25.7 | 25.0 | 3.4 | 29.1 | 156 | 542 | 6.4 | 1.52 | 7.24 | 1.46 |

| BLEND | VISCOSITY ZERO-SHEAR POISE | MICRO-FUSION RESIDUE | PERCENT SMECTIC CONTENT | ELONGATION % | HELICAL ORIENTATION BY AIR-1R $P_x$ | TOTAL ORIENTATION BY X-RAY | HELICAL ORIENTATION BY TRAYSMISSION IR (BULK) $P_x$ |
|---|---|---|---|---|---|---|---|
| 1 | 0.77 | GOOD   | 35.5 | 553 | 45.0 | .249 |    |
| 2 | 0.99 | V-GOOD | 33.8 | 520 | 49.9 | .248 | 69 |
| 3 | 0.64 | FAIR   | 36.4 | 522 | 51.9 | .195 | 65 |
| 4 | 0.70 | GOOD   | 33.4 | 585 | 48.4 | .226 |    |
| 5 |      |        |      |     |      |      |    |
| 6 | 0.75 | GOOD   | 33.1 | 494 | 50.3 | .226 |    |
| 7 | 0.71 | GOOD   | 36.7 | 510 | 54.2 | .233 | 67 |

TABLE 5

SECOND STEP DRAW CONDITIONS/FIBER PROPERTIES FOR FIBER DESCRIBED IN TABLE 4 1.4 × DRAW/HIGH TEMPERATURE-CONDITION A

| BLEND | MECHANICAL DRAW RATIO | 1ST QUINTET TEMP (°C.) | 2ND QUINTET TEMP (°C.) | dpf | TENACITY g/denier | ELONGATION % |
|---|---|---|---|---|---|---|
| 1 | 1.4 | 40 | 125 | 2.4 | 2.0 | 339 |
| 2 | 1.4 | 40 | 110 | 2.5 | 1.8 | 357 |
| 3 | 1.4 | 40 | 110 | 2.6 | 1.8 | 409 |
| 4 | 1.4 | 40 | 110 | 2.6 | 1.8 | 347 |
| 5 | 1.4 | 40 | 115 | 2.5 | 1.9 | 382 |
| 6 | 1.4 | 40 | 110 | 2.6 | 1.9 | 369 |
| 7 | 1.4 | 40 | 110 | 2.7 | 2.2 | 330 |

TABLE 6

SECOND STEP DRAW CONDITIONS/FIBER PROPERTIES FOR FIBER DESCRIBED IN TABLE 4 1.65 × -HIGH TEMPERATURE-CONDITION B

| BLEND | MECHANICAL DRAW RATIO | 1ST QUINTET TEMP (°C.) | 2ND QUINTET TEMP (°C.) | dpf | TENACITY g/denier | ELONGATION % |
|---|---|---|---|---|---|---|
| 2 | 1.65 | 40 | 110 | 2.3 | 2.2 | 351 |
| 3 | 1.65 | 40 | 110 | 2.5 | 2.1 | 328 |
| 4 | 1.65 | 40 | 110 | 2.1 | 2.0 | 377 |
| 5 | 1.65 | 40 | 110 | 2.2 | 2.1 | 245 |
| 6 | 1.65 | 40 | 110 | 2.2 | 2.3 | 338 |
| 7 | 1.65 | 40 | 110 | 2.2 | 2.4 | 235 |

TABLE 7

SECOND STEP DRAW CONDITIONS/FIBER PROPERTIES FOR FIBER DESCRIBED IN TABLE 4 1.4 × -LOW TEMPERATURE-CONDITION C

| BLEND | MECHANICAL DRAW RATIO | 1ST QUINTET TEMP (°C.) | 2ND QUINTET TEMP (°C.) | dpf | TENACITY g/denier | ELONGATION % |
|---|---|---|---|---|---|---|
| 1 | 1.4 | 25 | 25 | 2.7 | 1.8 | 451 |
| 2 | 1.65 | 25 | 25 | 2.7 | 1.7 | 436 |
| 3 | 1.4 | 25 | 25 | 2.7 | 1.7 | 480 |
| 4 | 1.4 | 25 | 25 | 2.9 | 1.6 | 443 |
| 5 | 1.4 | 25 | 25 | 2.7 | 1.7 | 477 |
| 6 | 1.4 | 25 | 25 | 2.7 | 1.9 | 439 |
| 7 | 1.4 | 25 | 25 | 2.6 | 2.1 | 395 |

TABLE 8

CROSS DIRECTIONAL PROPERTIES FOR FABRICS MADE FROM 1.4 × AND HIGH TEMPERATURE DRAW CONDITION

| BLEND # | DRAW CON-DI-TION | CDS @ 148° C. N/5 cm | CDS @ 151° C. N/5 cm | CDS @ 154° C. N/5 cm | CDS @ 157° C. N/5 cm | CDS @ 160l° C. N/5 cm | CDS @ 163° C. N/5 cm | CDS @ 166° C. N/5 cm | CDS @ 169° C. N/5 cm | CDS @ 172° C. N/5 cm | NORM CURVE MAX CDS N/5 cm | NORM CURVE MAX TEA mJ 5 cm |
|---|---|---|---|---|---|---|---|---|---|---|---|---|
| 1 | A | 9.8 | 11.6 | 10.3 | 12.1 | 13.0 | 13.1 | 13.2 | 11.7 | 11.8 | 12.7 | 259 |
| 2 | A | 10.4 | 9.7 | 11.1 | 11.7 | 13.3 | 13.2 | 13.2 | 13.4 | 12.3 | 13.1 | 287 |
| 3 | A | 6.9 | 8.0 | 11.7 | 12.1 | 13.4 | 14.1 | 13.4 | 13.4 | 13.0 | 13.9 | 272 |
| 4 | A | 10.8 | 12.8 | 12.4 | 14.4 | 13.0 | 13.3 | 12.9 | 11.9 | 10.0 | 13.7 | 274 |
| 5 | A | 8.2 | 11.0 | 11.0 | 10.9 | 13.1 | 12.5 | 12.4 | 10.9 | 10.4 | 12.4 | 244 |
| 6 | A | 9.2 | 9.1 | 9.3 | 10.5 | 12.4 | 12.2 | 12.3 | 12.4 | 10.2 | 12.2 | 246 |
| 7 | A | 3.8 | 5.4 | 7.3 | 10.8 | 12.2 | 11.1 | 12.4 | 12.1 | 11.3 | 12.3 | 188 |

| BLEND # | DRAW CON-DI-TION | CDE @ 148° C. % | CDE @ 151° C. % | CDE @ 154° C. % | CDE @ 157° C. % | CDE @ 160° C. % | CDE @ 163° C. % | CDE @ 166° C. % | CDE @ 169° C. % | CDE @ 172° C. % | CURVE MAX CDE % |
|---|---|---|---|---|---|---|---|---|---|---|---|
| 1 | A | 118 | 144 | 134 | 159 | 158 | 140 | 144 | 115 | 112 | 150 |
| 2 | A | 145 | 124 | 145 | 148 | 171 | 150 | 149 | 149 | 133 | 150 |
| 3 | A | 89 | 96 | 129 | 132 | 141 | 142 | 132 | 119 | 113 | 137 |
| 4 | A | 139 | 147 | 145 | 154 | 139 | 133 | 123 | 104 | 92 | 145 |
| 5 | A | 115 | 143 | 130 | 144 | 160 | 142 | 147 | 115 | 105 | 145 |
| 6 | A | 133 | 118 | 118 | 138 | 145 | 154 | 145 | 141 | 99 | 145 |
| 7 | A | 58 | 70 | 90 | 111 | 119 | 101 | 115 | 113 | 107 | 117 |

TABLE 9

CROSS DIRECTIONAL PROPERTIES FOR FABRICS MADE FROM 1.65 × AND HIGH TEMPERATURE DRAW CONDITION

| BLEND # | DRAW CON-DI-TION | NORM CDS @ 148° C. N/5 cm | CDS @ 151° C. N/5 cm | CDS @ 154° C. N/5 cm | CDS @ 157° C. N/5 cm | CDS @ 160° C. N/5 cm | CDS @ 163° C. N/5 cm | CDS @ 166° C. N/5 cm | CDS @ 169° C. N/5 cm | CDS @ 172° C. N/5 cm | CURVE MAX N/5 cm | CURVE MAX TEA mJ 5 cm |
|---|---|---|---|---|---|---|---|---|---|---|---|---|
| 2 | B | 4.5 | 6.9 | 10.3 | 11.7 | 12.0 | 13.0 | 12.8 | 12.9 | 11.3 | 13.0 | 218 |
| 3 | B | 3.8 | 5.9 | 8.5 | 10.5 | 11.5 | 11.3 | 10.2 | 10.5 | 8.4 | 11.4 | 175 |
| 4 | B | 4.3 | 7.8 | 8.3 | 10.4 | 11.6 | 12.1 | 11.8 | 10.9 | 9.8 | 11.9 | 198 |
| 5 | B | 5.1 | 5.5 | 7.7 | 8.5 | 9.6 | 9.8 | 10.2 | 10.0 | 8.8 | 9.9 | 157 |

TABLE 9-continued

CROSS DIRECTIONAL PROPERTIES FOR FABRICS MADE FROM 1.65 x AND HIGH TEMPERATURE DRAW CONDITION

| | | | | | | | | | | | |
|---|---|---|---|---|---|---|---|---|---|---|---|
| 6 | B | 5.5 | 6.3 | 6.9 | 8.6 | 9.6 | 8.1 | 10.6 | 9.7 | 7.9 | 9.5 | 180 |
| 7 | B | 3.6 | 4.6 | 6.3 | 7.9 | 10.4 | 10.3 | 10.6 | 9.5 | 9.7 | 10.3 | 127 |

| BLEND # | DRAW CON- DI- TION | CDE @ 148° C. % | CDE @ 151° C. % | CDE @ 154° C. % | CDE @ 157° C. % | CDE @ 160° C. % | CDE @ 163° C. % | CDE @ 166° C. % | CDE @ 169° C. % | CDE @ 172° C. % | CURVE MAX CDE % |
|---|---|---|---|---|---|---|---|---|---|---|---|
| 2 | B | 73 | 98 | 125 | 140 | 135 | 142 | 137 | 134 | 118 | 140 |
| 3 | B | 65 | 85 | 106 | 126 | 125 | 111 | 97 | 100 | 79 | 125 |
| 4 | B | 75 | 109 | 112 | 125 | 131 | 132 | 122 | 106 | 94 | 135 |
| 5 | B | 91 | 98 | 123 | 120 | 135 | 130 | 125 | 120 | 105 | 130 |
| 6 | B | 106 | 106 | 110 | 134 | 140 | 102 | 133 | 113 | 90 | 135 |
| 7 | B | 53 | 58 | 69 | 80 | 97 | 88 | 94 | 83 | 88 | 100 |

TABLE 10

CROSS DIRECTIONAL PROPERTIES FOR FABRICS MADE FROM 1.4 x AND LOW TEMPERATURE DRAW CONDITION

| BLEND # | DRAW CON- DI- TION | CDS @ 148° C. N/5 cm | CDS @ 151° C. N/5 cm | CDS @ 154° C. N/5 cm | CDS @ 157° C. N/5 cm | CDS @ 160° C. N/5 cm | CDS @ 163° C. N/5 cm | CDS @ 166° C. N/5 cm | CDS @ 169° C. N/5 cm | CDS @ 172° C. N/5 cm | CURVE MAX CDS N/5 cm | CURVE MAX TEA mJ 5 cm |
|---|---|---|---|---|---|---|---|---|---|---|---|---|
| 1 | C | 0.0 | 11.3 | 11.9 | 10.4 | 12.2 | 12.3 | 11.9 | 11.8 | 12.5 | 12.0 | 289 |
| 2 | C* | 12.3 | 11.8 | 13.0 | 13.5 | 13.5 | 14.1 | 13.8 | 13.4 | 13.2 | 13.8 | 343 |
| 3 | C | 10.4 | 10.8 | 11.8 | 12.6 | 12.4 | 11.8 | 11.7 | 11.7 | 11.3 | 12.3 | 284 |
| 4 | C | 7.3 | 9.5 | 12.2 | 12.2 | 13.1 | 11.2 | 12.5 | 12.4 | 11.4 | 12.8 | 297 |
| 5 | C | 10.2 | 11.2 | 11.8 | 11.6 | 11.0 | 10.9 | 11.4 | 11.0 | 9.8 | 11.5 | 267 |
| 6 | C | 8.0 | 10.0 | 10.6 | 12.0 | 12.1 | 11.5 | 11.4 | 9.2 | 11.1 | 11.8 | 251 |
| 7 | C | 6.6 | 6.0 | 8.4 | 10.2 | 12.4 | 12.4 | 12.1 | 11.9 | 11.2 | 12.2 | 236 |

| BLEND # | DRAW CON- DI- TION | CDE @ 148° C. % | CDE @ 151° C. % | CDE @ 154° C. % | CDE @ 157° C. % | CDE @ 160° C. % | CDE @ 163° C. % | CDE @ 166° C. % | CDE @ 169° C. % | CDE @ 172° C. % | CURVE MAX CDE % |
|---|---|---|---|---|---|---|---|---|---|---|---|
| 1 | C | | 165 | 191 | 147 | 185 | 173 | 168 | 156 | 143 | 180 |
| 2 | C* | 167 | 157 | 186 | 176 | 171 | 171 | 164 | 157 | 137 | 155 |
| 3 | C | 142 | 155 | 156 | 163 | 161 | 144 | 128 | 128 | 121 | 145 |
| 4 | C | 103 | 131 | 170 | 153 | 161 | 122 | 139 | 140 | 119 | 145 |
| 5 | C | 167 | 178 | 197 | 182 | 156 | 149 | 164 | 132 | 112 | 180 |
| 6 | C | 127 | 150 | 152 | 175 | 165 | 129 | 131 | 97 | 119 | 150 |
| 7 | C | 94 | 92 | 115 | 136 | 159 | 158 | 133 | 132 | 115 | 130 |

*Blend 2 was drawn at 1.65 x

EXAMPLE 2

Fibers were individually prepared using a two step process. In the first step, blended compositions of linear isotactic polypropylene flake (obtained from Himont, Inc., and identified in Table 11 as "A", "C", "E", "F" and "G") were prepared by tumble mixing blends of combinations of these polymers.

The admixtures contained about 75 ppm of a primary antioxidant, Irganox 1076 made by Ciba-Geigy Corp. In addition, 300 ppm of a secondary antioxidant, Irgafos 168 made by Ciba-Geigy Corp., were added to each blend, with Table 12 indicating the amounts of stabilization additives.

The mix was then heated, extruded and spun into a circular cross section fiber at a melt temperature of about 300° to 305° C. Prior to melting, the mixture was blanketed with nitrogen. The melt was extruded through standard 1068 hole spinnerettes taken up at a rate of 794 meters per minute to prepare spin yarn which is 2.7 denier per filament, (2.9 dtex). The fiber threadlines in the quench box were exposed to an ambient air quench of about 250 ft/min (cross blow) with 20 millimeters of the quench nearest the spinnerette blocked off from the cross blow area to delay the quenching step. Also, quenching was performed under similar conditions but without blocking, e.g., without a shroud, so as to obtain comparative fibers without delayed quenching.

In the second step, the resulting continuous filaments were collectively drawn using three sets of mechanical draw ratio and roll temperature conditions. These are: (D) 1.3× draw ratio with draw rolls heated to 40° C. and 100° C., (E) 1.6× draw ratio with draw rolls heated to 60° C., and (F) 1.1× with ambient temperature (25° C.) draw rolls. The drawn tow was crimped at about 30 crimps per inch (118 crimps per 10 cm) using a stuffer box with steam.

During each step, the fiber was coated with a finish mixture (0.4 to 1.2 weight % finish on fiber by weight) of an ethoxylated fatty acid ester and an ethoxylated alcohol phosphate (from George A. Ghoulston Co., Inc., Monroe, N.C., under the name Lurol PP 912), and cut to 1.5 inches (38 mm).

Fibers of each blend composition and each draw condition were then carded into conventional fiber webs at 250 feet per minute (76 meters/min) using e quipment and procedures discussed in Legare, 1986 TAPPI Synthetic Fibers for Wet System and Thermal Bonding Applications, Boston Park Plaza Hotel & Towers, Boston, Mass., October 9–10, 1986, "Thermal Bonding of Polypropylene Fibers in Nonwovens", pages 1–13 and attached Tables and Figures. Specifically, three-ply webs of staple were identically oriented and stacked (primarily in the machine direction), and bonded using a calendar roll having diamond bond points with a total bond areas of about 20%, and a smooth roll at roll temperatures ranging from 142° to 179° C. and roll pressures of 240 pounds per linear inch (420 Newtons per linear centimeter) to obtain test non-wovens weighing nominally 20 grams per square yard (23.9 grams per square meter) for fiber draw conditions D and E and 25 grams per square yard (30 grams per square meter) for fiber draw condition F.

Test strips of each non-woven, 1 inch×7 inches (25 mm×178 mm) were then identically tested for cross directional (CD) strength, elongation, and toughness (defined as energy to break fabric based on area under stress-strain curve values).

The composition and characterization of each blend is shown in Table 12. Characterizations of fiber spun from each composition are shown in Tables 13 and 14, with Table 13 characterizing the spun fiber produced without a shroud and Table 14 characterizing the spun fiber produced using a delayed quench. Tables 15, 16 and 17 contain the draw conditions for each spin fiber shown in Table 14. Tables 18–20 show cross directional properties for fabrics made draw and temperature conditions D, E and F, respectively, for normalized cross directional strength, elongation and toughness.

Although the invention has been described with reference to particular means, materials and embodiments, it is to be understood that the invention is not limited to the particulars disclosed and extends to all equivalents within the scope of the claims.

TABLE 11

INDIVIDUAL POLYMER PROPERTIES

| POLYMER | PLATOMETER MFR dg/min | RDS MFR | RDS PI | RDS MWD | SEC $M_n \times 10^{-3}$ g/mol | SEC $M_w \times 10^{-3}$ g/mol | SEC MWD | WT % > $1 \times 10^6$ g/mol | WT % > $5 \times 10^5$ g/mol |
|---|---|---|---|---|---|---|---|---|---|
| A | 4 | 4.2 | 4.38 | 5.0 | 71.2 | 330 | 4.6 | 6.59 | 17.59 |
| E | 13 | | | | 45.9 | 299 | 5.0 | 3.30 | 10.60 |
| C | 10 | 11.6 | 4.68 | 5.3 | 23.5 | 274 | 11.7 | 4.99 | 13.59 |
| F | 400 | | | | 12.1 | 98.6 | 8.1 | 0.47 | 2.06 |
| G | 1 | | | | 23.5 | 536 | 22.8 | 12.3 | 27.2 |

TABLE 12

COMPOSITIONS

| BLEND | %G | %F | %A | %C | %E | wt. % Irgafos 168 | wt. % Irganox 1076 | PLASTOMETER MFR dg/min | RDS PI | SEC $M_n \times 10^{-3}$ g/mol | SEC $M_w \times 10^{-3}$ g/mol | SEC MWD | wt % > $1 \times 10^6$ g/mol | wt % > $5 \times 10^5$ g/mol |
|---|---|---|---|---|---|---|---|---|---|---|---|---|---|---|
| 8 | 2 | 10 | 0 | 88 | 0 | .03 | .0075 | | | 25.3 | 275 | 10.9 | 5.02 | 13.2 |
| 9 | 2 | 10 | 0 | 0 | 88 | .03 | .0075 | | | 20.3 | 230 | 11.3 | 3.56 | 10.3 |
| 10 | 1 | 10 | 89 | 0 | 0 | .03 | .0075 | | | 52.6 | 329 | 6.3 | 5.05 | 14.2 |

TABLE 13

PROPERTIES OF FIBER WITHOUT DELAYED QUENCH

| BLEND | PLAST MFR dg/min. | RDS MFR dg/min. | RDS PI | SEC $M_n \times 10^{-3}$ g/mol | SEC $M_w \times 10^{-3}$ g/mol | SEC $M_z \times 10^{-3}$ g/mol | SEC MWD | WT % > $1 \times 10^6$ g/mol | WT % > $5 \times 10^5$ g/mol | ELONGATION % |
|---|---|---|---|---|---|---|---|---|---|---|
| 8 | 16.4 | 17.9 | 4.6 | 23.4 | 226 | 908 | 9.7 | 3.30 | 10.8 | 489 |
| 9 | 24.8 | 24.4 | 4.5 | 18.9 | 202 | 705 | 10.7 | 2.55 | 9.0 | 461 |
| 10 | 14.2 | 13.8 | 3.9 | 33.4 | 223 | 643 | 6.7 | 2.8 | 10.7 | 427 |

TABLE 14

PROPERTIES OF FIBER WITH DELAYED QUENCH

| BLEND | PLAST MFR (dg/min) | RDS MFR (dg/min) | RDS PI | SEC $M_n \times 10^{-3}$ g/mol | SEC $M_w \times 10^{-3}$ g/mol | SEC $M_z \times 10^{-3}$ g/mol | SEC MWD | WT % > $1 \times 10^6$ g/mol | WT % > $5 \times 10^5$ g/mol | ELONGATION % |
|---|---|---|---|---|---|---|---|---|---|---|
| 8 | 37.7 | 36.9 | 4.4 | 13.9 | 199 | 824 | 14.3 | 2.65 | 8.8 | 486 |
| 9 | 38.3 | 37.4 | 4.2 | 26.2 | 183 | 547 | 7.0 | 1.90 | 7.6 | 484 |
| 10 | 28.0 | 26.3 | 3.9 | 25.7 | 201 | 600 | 7.8 | 2.20 | 9.0 | 478 |

TABLE 15

SECOND STEP DRAW CONDITIONS/FIBER PROPERTIES FOR FIBER DESCRIBED IN TABLE 14-1.3 × DRAW/HIGH TEMPERATURE-CONDITION D

| BLEND | MECHANICAL DRAW RATIO | 1ST QUINTET TEMP (°C.) | 2ND QUINTET TEMP (°C.) |
|---|---|---|---|
| 8 | 1.3 | 40 | 100 |
| 9 | 1.3 | 40 | 100 |
| 10 | 1.3 | 40 | 100 |

TABLE 16

SECOND STEP DRAW CONDITIONS/FIBER PROPERTIES FOR FIBER DESCRIBED IN TABLE 14-1.6 × -MEDIUM TEMPERATURE-CONDITION E

| BLEND | MECHANICAL DRAW RATIO | 1ST QUINTET TEMP (°C.) | 2ND QUINTET TEMP (°C.) |
|---|---|---|---|
| 8 | 1.6 | 60 | 60 |
| 9 | 1.6 | 60 | 60 |
| 10 | 1.6 | 60 | 60 |

TABLE 17

SECOND STEP DRAW CONDITIONS/FIBER PROPERTIES FOR FIBER DESCRIBED IN TABLE 14-1.14 × -LOW TEMPERATURE-CONDITION F

| BLEND | MECHANICAL DRAW RATIO | 1ST QUINTET TEMP (°C.) | 2ND QUINTET TEMP (°C.) |
|---|---|---|---|
| 8 | 1.1 | 25 | 25 |
| 10 | 1.1 | 25 | 25 |

TABLE 18

CROSS DIRECTIONAL PROPERTIES FOR FABRICS MADE FROM 1.3 × AND HIGH TEMPERATURE DRAW CONDITION D

CDS CDE and CD TEA normalized to 20 grams per square yard

| BLEND # | DRAW CON- DI- TION | CDS @ 148° C. N/5 cm | CDS @ 151° C. N/5 cm | CDS @ 154° C. N/5 cm | CDS @ 157° C. N/5 cm | CDS @ 160° C. N/5 cm | CDS @ 163° C. N/5 cm | CDS @ 166° C. N/5 cm |
|---|---|---|---|---|---|---|---|---|
| 8 | D | 10.9 | 10.2 | 10.9 | 12.7 | 14.7 | 13.1 | 13.6 |
| 9 | D | 7.4 | 9.0 | 10.7 | 12.0 | 11.9 | 11.6 | 10.7 |
| 10 | D | 9.1 | 10.6 | 12.2 | 12.3 | 12.1 | 11.7 | 12.9 |

NORMALIZED CROSS DIRECTIONAL ELONGATION (CDE)

| BLEND # | DRAW CON- DI- TION | CDE @ 148° C. % | CDE @ 151° C. % | CDE @ 154° C. % | CDE @ 157° C. % | CDE @ 160° C. % | CDE @ 163° C. % | CDE @ 166° C. % |
|---|---|---|---|---|---|---|---|---|
| 8 | D | 122 | 151 | 134 | 148 | 147 | 146 | 139 |
| 9 | D | 125 | 153 | 138 | 133 | 114 | 94 | 71 |
| 10 | D | 107 | 127 | 138 | 141 | 131 | 120 | 124 |

NORMALIZED CROSS DIRECTIONAL TOUGHNESS (TEA)

| BLEND # | DRAW CON- DI- TION | CD TEA @ 148° C. mJ/5 cm | CD TEA @ 151° C. mJ/5 cm | CD TEA @ 154° C. mJ/5 cm | CD TEA @ 157° C. mJ/5 cm | CD TEA @ 160° C. mJ/5 cm | CD TEA @ 163° C. mJ/5 cm | CD TEA @ 166° C. mJ/5 cm |
|---|---|---|---|---|---|---|---|---|
| 8 | D | 140 | 263 | 210 | 268 | 290 | 282 | 271 |
| 9 | D | 119 | 172 | 221 | 268 | 247 | 227 | 173 |
| 10 | D | 130 | 188 | 233 | 243 | 215 | 188 | 214 |

TABLE 19

CROSS DIRECTIONAL PROPERTIES FOR FABRICS MADE FROM 1.6 × AND MEDIUM TEMPERATURE DRAW CONDITION D
CDS CDE and CD TEA normalized to 20 grams per square yard

NORMALIZED CROSS DIRECTIONAL STRENGTH (CDS)

| BLEND # | DRAW CONDITION | CDS @ 148° C. N/5 cm | CDS @ 151° C. N/5 cm | CDS @ 154° C. N/5 cm | CDS @ 157° C. N/5 cm | CDS @ 160° C. N/5 cm | CDS @ 163° C. N/5 cm | CDS @ 166° C. N/5 cm |
|---|---|---|---|---|---|---|---|---|
| 8 | E | 9.7 | 11.4 | 10.9 | 11.1 | 11.0 | 10.9 | 11.1 |
| 9 | E | 7.1 | 8.8 | 9.1 | 9.6 | 10.0 | 9.6 | 9.0 |
| 10 | E | 8.8 | 8.6 | 10.2 | 9.6 | 10.7 | 11.2 | 11.1 |

NORMALIZED CROSS DIRECTIONAL ELONGATION (CDE)

| BLEND # | DRAW CONDITION | CDE @ 148° C. % | CDE @ 151° C. % | CDE @ 154° C. % | CDE @ 157° C. % | CDE @ 160° C. % | CDE @ 163° C. % | CDE @ 166° C. % |
|---|---|---|---|---|---|---|---|---|
| 8 | E | 138 | 155 | 145 | 138 | 134 | 128 | 123 |
| 9 | E | 124 | 134 | 130 | 134 | 133 | 120 | 101 |
| 10 | E | 119 | 116 | 126 | 118 | 126 | 135 | 126 |

NORMALIZED CROSS DIRECTIONAL TOUGHNESS (TEA)

| BLEND # | DRAW CONDITION | CD TEA @ 148° C. mJ/5 cm | CD TEA @ 151° C. mJ/5 cm | CD TEA @ 154° C. mJ/5 cm | CD TEA @ 157° C. mJ/5 cm | CD TEA @ 160° C. mJ/5 cm | CD TEA @ 163° C. mJ/5 cm | CD TEA @ 166° C. mJ/5 cm |
|---|---|---|---|---|---|---|---|---|
| 8 | E | 183 | 242 | 214 | 211 | 193 | 186 | 185 |
| 9 | E | 117 | 159 | 160 | 172 | 181 | 159 | 124 |
| 10 | E | 136 | 132 | 165 | 147 | 177 | 163 | 181 |

TABLE 20

CROSS DIRECTIONAL PROPERTIES FOR FABRICS MADE FROM 1.14 × AND AMBIENT TEMPERATURE DRAW CONDITION F
CDS, CDE & CD TEA normalized to 20 grams per square yard

NORMALIZED CROSS DIRECTIONAL STRENGTH (CDS)

| BLEND # | DRAW CONDITION | CDS @ 142° C. N/5 cm | CDS @ 145° C. N/5 cm | CDS @ 148° C. N/5 cm | CDS @ 151° C. N/5 cm | CDS @ 154° C. N/5 cm | CDS @ 157° C. N/5 cm | CDS @ 160° C. N/5 cm | CDS @ 163° C. N/5 cm | CDS @ 166° C. N/5 cm | CDS @ 169° C. N/5 cm |
|---|---|---|---|---|---|---|---|---|---|---|---|
| 8 | F | 8.3 | 7.9 | 10.2 | 11.0 | 11.5 | 11.8 | 12.5 | 12.5 | 12.7 | 12.3 |
| 10 | F | 9.2 | 10.7 | 9.9 | 9.9 | 10.7 | 10.8 | 11.7 | 11.5 | 10.7 | 11.7 |

NORMALIZED CROSS DIRECTIONAL ELONGATION (CDE)

| BLEND # | DRAW CONDITION | CDE @ 142° C. % | CDE @ 145° C. % | CDE @ 148° C. % | CDE @ 151° C. % | CDE @ 154° C. % | CDE @ 157° C. % | CDE @ 160° C. % | CDE @ 163° C. % | CDE @ 166° C. % | CDE @ 169° C. % |
|---|---|---|---|---|---|---|---|---|---|---|---|
| 8 | F | 123 | 120 | 165 | 173 | 148 | 166 | 184 | 159 | 156 | 143 |
| 10 | F | 140 | 157 | 154 | 149 | 157 | 164 | 175 | 145 | 119 | 132 |

NORMALIZED CROSS DIRECTIONAL TOUGHNESS (TEA)

| BLEND # | DRAW CONDITION | CD TEA @ 142° C. mJ/5 cm | CD TEA @ 145° C. mJ/5 cm | CD TEA @ 148° C. mJ/5 cm | CD TEA @ 151° C. mJ/5 cm | CD TEA @ 154° C. mJ/5 cm | CD TEA @ 157° C. mJ/5 cm | CD TEA @ 160° C. mJ/5 cm | CD TEA @ 163° C. mJ/5 cm | CD TEA @ 166° C. mJ/5 cm | CD TEA @ 169° C. mJ/5 cm |
|---|---|---|---|---|---|---|---|---|---|---|---|
| 8 | F | 153 | 143 | 261 | 299 | 257 | 292 | 359 | 293 | 295 | 264 |
| 10 | F | 186 | 260 | 226 | 222 | 246 | 262 | 306 | 234 | 172 | 221 |

Note:
fabrics made at a target basis weight of 25 grams per square yard

What is claimed:

1. A process for preparing at least one polypropylene containing fiber, comprising:

extruding an admixture comprising a blend made from at least two separate polypropylene containing materials to form at least one hot extrudate having a surface, said admixture having a broad molecular weight distribution; and quenching the at least one hot extrudate in an oxidative atmosphere so as to effect oxidative chain scission degradation of the surface to obtain at least one skin-core fiber having a higher average melt flow rate as compared to an average melt flow rate of an inner, non-degraded portion of the at least one fiber corresponding substantially to non-degraded fiber, the at least one fiber containing at least 7 weight percent of molecules having a molecular weight greater than $5 \times 10^5$.

2. The process according to claim 1, wherein the admixture contains at least one member selected from the group consisting of a melt flow stabilizer and an antioxidant in an amount effective to maintain the at least 7 weight percent of molecules having a molecular weight greater than $5 \times 10^5$ in said at least one fiber.

3. The process according to claim 1, wherein the admixture has a molecular weight distribution of at least about 5.5.

4. The process according to claim 3, wherein the admixture has a molecular weight distribution of at least about 6.

5. The process according to claim 4, wherein the admixture has a molecular weight distribution of at least about 7.

6. The process according to claim 1, wherein the average melt flow rate of the at least one fiber is at least about 20.

7. The process according to claim 6, wherein the maximum average melt flow rate of the at least one fiber is about 70.

8. The process according to claim 1, wherein the admixture includes at least one member selected from the group consisting of a melt flow stabilizer and an antioxidant.

9. The process according to claim 8, wherein the at least one member selected from the group consisting of a melt flow stabilizer and an antioxidant comprises about 0.01 to 2.0 percent by weight of the admixture.

10. The process according to claim 9, wherein the at least one member selected from the group consisting of a melt flow stabilizer and an antioxidant comprises about 0.02 to 1.0 percent by weight of the admixture.

11. The process according to claim 10, wherein the at least one member selected from the group consisting of a melt flow stabilizer and an antioxidant comprises about 0.03 to 0.07 percent by weight of the admixture.

12. The process according to claim 11, wherein the at least one member selected from the group consisting of a melt flow stabilizer and an antioxidant comprises about 0.05 to 0.06 percent by weight of the admixture.

13. The process according to claim 7, wherein the at least one member selected from the group consisting of a melt flow stabilizer and an antioxidant comprises at least one member selected from the group consisting of phenylphosphites and hindered phenolics.

14. The process according to claim 1, wherein the average melt flow rate of the at least one fiber is about 20 to 200% higher than the melt flow rate of the non-degraded portion of the at least one fiber.

15. The process according to claim 1, wherein the quenching of the at least one hot extrudate in an oxidative atmosphere to effect oxidative chain scission degradation of the surface of the at least one fiber includes controlling the quenching rate of the hot extrudate.

16. The process according to claim 1, wherein the quenching of the at least one hot extrudate in an oxidative atmosphere to effective oxidative chain scission degradation of the surface of at least one fiber comprises delaying quenching of the at least one extrudate.

17. The process according to claim 16, wherein the oxygen containing quenching atmosphere comprises a cross-blow quench, and an upper portion of the cross-blow quench is blocked.

18. The process according to claim 1, wherein the admixture is extruded at a temperature of about 250° C. to 325° C.

19. The process according to claim 18, wherein admixture is extruded at a temperature of about 275° C. to 320° C.

20. The process according to claim 15, wherein the controlling quenching of the at least one hot extrudate in an oxidative atmosphere so as to effect oxidative chain scission degradation of the surface comprises maintaining the temperature of the at least one hot extrudate above about 250° C. for a period of time to obtain oxidative chain scission degradation of the surface.

21. The process according to claim 20, wherein the controlling quenching includes blocking an upper portion of a cross-blow quench.

22. The process according to claim 20, wherein the controlling quenching includes passing the at least one hot extrudate through a blocked zone.

23. The process according to claim 22, wherein the blocked zone is open to the oxidative atmosphere.

24. The process according to claim 1, wherein the polypropylene containing material in the admixture comprises at least one member selected from the group consisting of polypropylene having a melt flow rate of 1, 4, 10, 13, 20 and 400.

25. A process for preparing at least one polypropylene containing fiber, comprising:

extruding an admixture comprising a blend made of at least two separate polypropylene containing materials to form at least one hot extrudate having a surface, said admixture having a broad molecular weight distribution; and quenching the at least one hot extrudate in an oxidative atmosphere so as to effect oxidative chain scission degradation of the surface to obtain at least one skin-core fiber having a higher average melt flow rate as compared to an average melt flow rate of an inner, non-degraded portion of the at least one fiber corresponding to substantially non-degraded fiber or filament, the fiber containing at least 9 weight percent of molecules having a molecular weight greater than $5 \times 10^5$ when the average melt flow rate of the at least one fiber is less than or equal to 27, and containing at least 7 weight percent of molecules having a molecular weight greater than $5 \times 10^5$ when the average melt flow rate of the at least one fiber is greater than 27.

26. The process according to claim 25, wherein the admixture has a molecular weight distribution of at least about 5.5.

27. The process according to claim 26, wherein the admixture has a molecular weight distribution of at least about 6.

28. The process according to claim 27, wherein the admixture has a molecular weight distribution of at least about 7.

29. The process according to claim 25, wherein the average melt flow rate of the at least one fiber is at least about 20.

30. The process according to claim 29, wherein the maximum average melt flow rate of the at least one fiber is at least about 70.

31. The process according to claim 25, wherein the admixture includes at least one member selected from the group consisting of a melt flow stabilizer and an antioxidant.

32. The process according to claim 31, wherein the at least one member selected from the group consisting of a melt flow stabilizer and an antioxidant comprises about 0.01 to 2.0 percent by weight of the admixture.

33. The process according to claim 32, wherein the at least one member selected from the group consisting of a melt flow stabilizer and an antioxidant comprises about 0.02 to 1.0 percent by weight of the admixture.

34. The process according to claim 33, wherein the at least one member selected from the group consisting of a melt flow stabilizer and an antioxidant comprises about 0.03 to 0.07 percent by weight of the admixture.

35. The process according to claim 34, wherein the at least one member selected from the group consisting of a melt flow stabilizer and an antioxidant comprises about 0.05 to 0.06 percent by weight of the admixture.

36. The process according to claim 32, wherein the at least one member selected from the group consisting of a melt flow stabilizer and an antioxidant comprises at least one member selected from the group consisting of phenylphosphites and hindered phenolics.

37. The process according to claim 25, wherein the average melt flow rate of the at least one fiber is about 20 to 200% higher than the melt flow rate of the non-degraded portion of the at least one fiber.

38. The process according to claim 25, wherein the quenching of the at least one hot extrudate in an oxidative atmosphere to effect oxidative chain scission degradation of the surface of the at least one fiber includes controlling the quenching rate of the hot extrudate.

39. The process according to claim 25, wherein the controlling of the quenching of the at least one hot extrudate comprises delaying quenching of the at least one extrudate.

40. The process according to claim 39, wherein the oxygen containing quenching atmosphere comprises a cross-blow quench, and an upper portion of the cross-blow quench is blocked.

41. The process according to claim 25, wherein the admixture is extruded at a temperature of about 250° C. to 325° C.

42. The process according to claim 41, wherein the admixture is extruded at a temperature of about 275° C. to 320° C.

43. The process according to claim 38, wherein the controlling quenching of the at least one hot extrudate in an oxygen containing atmosphere so as to effect oxidative chain scission of the surface comprises maintaining the temperature of the at least one hot extrudate above about 250° C. for a period of time to obtain oxidative chain scission degradation of the surface.

44. The process according to claim 43, wherein the controlling quenching includes blocking an upper portion of a cross-blow quench.

45. The process according to claim 43, wherein the controlling quenching includes passing the at least one hot extrudate through a blocked zone.

46. The process according to claim 45, wherein the blocked zone is open to the oxidative atmosphere.

47. The process according to claim 46 wherein the admixture comprises at least one member selected from the group consisting of polypropylene having a melt flow rate of about 1, 4, 10, 13, 20 and 400.

48. A process for preparing at least one polypropylene containing fiber, comprising:

extruding a polypropylene admixture comprising a blend made from separate polypropylene containing materials, said admixture having a molecular weight distribution broader than any individual component of the admixture to form at least one hot extrudate having a surface; and quenching the at least one hot extrudate in an oxidative atmosphere so as to effect oxidative chain scission degradation of the surface to obtain at least one skin-core fiber having a higher average melt flow rate as compared to an average melt flow rate of an inner, non-degraded portion of the at least one fiber corresponding substantially to non-degraded fiber or filament, the at least one fiber containing at least 7 weight percent of molecules having a molecular weight greater than $5 \times 10^5$.

49. The process according to claim 1, wherein said at least one fiber is formed into staple fiber.

50. The process according to claim 25, wherein said at least one fiber is formed into staple fiber.

51. The process according to claim 48, wherein said at least one fiber is formed into staple fiber.

52. The process according to claim 1, wherein said at least one fiber is drawn at ambient temperature.

53. The process according to claim 52, wherein said at least one fiber is drawn at a draw ratio of 1.4×.

54. The process according to claim 52, wherein said at least one fiber is drawn at a draw ratio of 1.65×.

55. The process according to claim 25, wherein said at least one fiber is drawn at ambient temperature.

56. The process according to claim 55, wherein said at least one fiber is drawn at a draw ratio of 1.4×.

57. The process according to claim 55, wherein said at least one fiber is drawn at a draw ratio of 1.65×.

58. The process according to claim 48, wherein said at least one fiber is drawn at ambient temperature.

59. The process according to claim 58, wherein said at least one fiber is drawn at a draw ratio of 1.4×.

60. The process according to claim 58, wherein said at least one fiber is drawn at a draw ratio of 1.65×.

61. The process according to claim 52, wherein said at least one fiber is drawn at a draw ratio of 1.1×.

62. The process according to claim 55, wherein said at least one fiber is drawn at a draw ratio of 1.1×.

63. The process according to claim 58, wherein said at least one fiber is drawn at a draw ratio of 1.1×.

* * * * *